US006928265B2

(12) United States Patent
Johannessen (10) Patent No.: US 6,928,265 B2
(45) Date of Patent: Aug. 9, 2005

(54) METHOD OF AND APPARATUS FOR IMPLEMENTING HIGH SPEED DATA COMMUNICATION BY PHASE (FREQUENCY) MODULATION OF LORAN-C NAVIGATION SYSTEM USING SOLID-STATE PULSE TRANSMITTERS AND HIGH-POWER SOLID STATE SWITCHING FOR DYNAMIC ANTENNA TUNING

(75) Inventor: Paul R. Johannessen, Lexington, MA (US)

(73) Assignee: Megapulse, Inc., North Billerica, MA (US)

(*) Notice: Subject to any disclaimer, the term of this patent is extended or adjusted under 35 U.S.C. 154(b) by 458 days.

(21) Appl. No.: 10/147,716

(22) Filed: May 7, 2002

(65) Prior Publication Data

US 2003/0214435 A1 Nov. 20, 2003

(51) Int. Cl.[7] .............................. H04B 1/04; G01S 1/24

(52) U.S. Cl. ..................... 455/42; 455/107; 455/127.1; 342/389

(58) Field of Search ......................... 455/42, 46, 107, 455/127.1; 342/388, 389, 390

(56) References Cited

U.S. PATENT DOCUMENTS

| 4,800,391 A | * | 1/1989 | Enge | .......................... 342/389 |
| 4,821,038 A | * | 4/1989 | Enge | .......................... 342/390 |
| 6,452,547 B1 | * | 9/2002 | Johannessen | .............. 342/388 |

* cited by examiner

Primary Examiner—Edward F. Urban
Assistant Examiner—Blane J. Jackson
(74) Attorney, Agent, or Firm—Rines and Rines

(57) ABSTRACT

A frequency-hopping intrapulse frequency modulation Loran-C navigation pulse technique, preferably using a flat-topped pulse shape and a novel 16-ary phase hopping scheme, and a novel improved high-power solid-state switch for dynamic antenna modulation tuning.

16 Claims, 13 Drawing Sheets

Switch with Booster Circuit

16 – Ary IFM (Prior Art)

FIG. 1

18 – Ary IFM (Prior Art)

FIG. 2

Improved 16 – Ary IFM

FIG. 3

Frequency Modulation

FIG. 4A

Frequency Modulation

Implementation of IFM for the phase
Arys of Figure 1

Standard Loran-C Pulse

FIG. 6

Flat Topped Loran-C Pulse

FIG. 7

Half-Cycle Loran-C Transmitter
Generator Assignment

FIG. 8A

Half-Cycle Loran-C Transmitter
Generator Assignment

Coupling Network Voltage for Flat Top Pulse

Loran-C Pulse and Bridge Current

FIG. 12

Voltage and Current Waveforms of Switch

Switch with Booster Circuit

FIG. 13

METHOD OF AND APPARATUS FOR IMPLEMENTING HIGH SPEED DATA COMMUNICATION BY PHASE (FREQUENCY) MODULATION OF LORAN-C NAVIGATION SYSTEM USING SOLID-STATE PULSE TRANSMITTERS AND HIGH-POWER SOLID STATE SWITCHING FOR DYNAMIC ANTENNA TUNING

FIELD

The present invention relates to improvements in radio pulse communication systems being more particularly concerned with digital signal data communicated simultaneously with and on radio navigation signal pulses as of the Loran-C type, such signals being carried by preferably phase/frequency modulation of the signal pulses.

BACKGROUND

A variety of systems have been proposed and used for adding communication data capability to radio navigation signals as described, for example, in U.S. Pat. Nos. 4,800,341 and 4,821,038 of common assignee herewith, and publications discussed therein.

A significant improvement in expanding the data communication speed or digital bit rate (at least from 70 bps to over 250 bps) for communication added to Loran-C radio navigation pulse trains also without affecting the navigation capability and integrity thereof; is described in my earlier copending patent application for Method Of And Apparatus For Expanding The Digital Bit Rate Potential For Communication Added To Loran-C Radio Navigation Pulse Trains And The Like, Without Affecting The Navigation Capability And Integrity Thereof, Ser. No. 09/833,022, filed Apr. 11, 2000, now U.S. Pat. No. 6,452,547, issued Sep. 17, 2002.

In this copending application, the Loran-C signal is frequency-modulated by tuning or sweeping the high-Q Loran-C antenna frequency between predetermined desired frequencies by varying series inductance and series capacitance at the antenna in steps, by means of fast, high-power, solid-state switches. This demonstrated feasibility initiated serious discussion as to the real potential of such intrapulse frequency modulation (IFM) for expanding the data communication capability of Loran-C navigation pulses.

A preferred and novel solid-state switching methodology and apparatus ideally suited for such Loran-C IFM was then disclosed in my further copending patent application, Method of High-Power Switching And Switch Apparatus For Frequency Modulation Within Loran-C Signals, Ser. No. 09/922,283, filed Aug. 3, 2001. This system embraced improved frequency—modulation switching apparatus for rapidly increasing and decreasing the frequency within the radio-frequency pulses of the Loran-C radio wave pulse trains transmitted by an antenna having series inductance and capacitance switchable into and out of circuit therewith. The apparatus comprises a solid state four-terminal rectifier bridge circuit with opposing pairs of bridge terminals connected with one pair of opposing terminals shunting said inductance and said capacitance; and series-connected staturable and linear inductors and an SCR switch connected between the other pair of opposing terminals of the bridge circuit, whereby the high-speed triggering of the SCR switch on, effects corresponding high-speed frequency increasing or decreasing of the frequency within the radio-frequency pulse to provide the desired frequency modulation therein. The switch turns off at the end of the radio-frequency pulse tail when the SCR switch current drops below its holding current.

Following these advances that have practically enabled increased data communication speed with such IFM applied to Loran-C navigation pulses, it became evident that effective back-up for the satellite WAAS system was now available with Loran-C pulses capable of transmitting the full WAAS message of 250 bits/500 symbols in one second, as described by Ben Peterson et al in "High Speed Loran-C Data Communications-2001 Update" appearing in Proceedings of Second International Symposium Integration of LORAN-C/Eurofix and Egnos/Galileo-Loran 2001, presented at Bonn, Germany, February, 2001. In later-described FIGS. 1 and 2, proposed IFM schemes of Peterson et al are shown involving specific phase "arys", wherein a plan or scheme of frequency hopping within the Loran-C pulse is effected, with the phase shifts at different times during the pulse measured, uniquely identifying the particular IFM ary, as later more fully explained. (The term "n-ary" function is defined as a function with any number n of arguments, by analogy to unary, binary, etc.).

In accordance with the present invention, however, a vastly improved IFM ary than such prior proposals is provided that enables less out-of-band energy to be obtained and with smaller frequency shifts required, that thus reduces the required voltage rating of the switches. The present invention also provides a novel circuit apparatus for implementing IFM schemes.

OBJECTS OF INVENTION

A primary object of the present invention, accordingly, is to provide a new and improved IFM frequency modulation scheme and methodology (and a preferred IFM ary) for expanded data communication modulation of Loran-C signals.

An additional object is to provide a novel circuit apparatus therefor.

Other and further objects will be explained hereinafter and are more particularly delineated in the appended claims.

SUMMARY

In summary, from one of its aspects, the invention embraces frequency modulation switching apparatus for rapidly frequency hopping within radio-frequency pulses of radio wave, pulse trains transmitted by an antenna having series impedance, the apparatus having, in combination, a solid state four-terminal rectifier bridge circuit connected to the antenna with opposing pairs of bridge terminals connected with one pair of opposing terminals shunting said impedance; series-connected saturable and linear inductors and an SCR switch connected between the other pair of opposing terminals of the bridge circuit, whereby the high-speed triggering of the SCR on, effects corresponding dynamic high-speed increasing or decreasing hopping of the frequency within the radio-frequency pulse to provide the desired frequency modulation therein; and an SCR-controlled booster circuit for supplying booster current to the bridge circuit in the time interval within the pulse when the bridge current is less than the antenna current.

Preferred and best mode configurations and designs and implementations are hereinafter detailed.

DRAWINGS

The invention will now be described with reference to the accompanying drawings in which FIGS. 1 and 2, as before mentioned, present 16-ary IFM and 18-ary IFM phase ary proposals of the earlier identified Peterson et al for frequency hopping within the successive times $t_0$–$t_6$ of the Loran-C pulse (I0–300/μsec along the abscissa and I0–300° phase along the ordinate), identifying ary lines 1–16 at the right in FIG. 1.

DESCRIPTION OF PREFERRED EMBODIMENT (S) OF INVENTION

As previously noted, my said first copending application Ser. No. 09/833,022 discloses the type of circuit of FIG. 5 herein for implementing IFM schemes generally.

Figure 5:
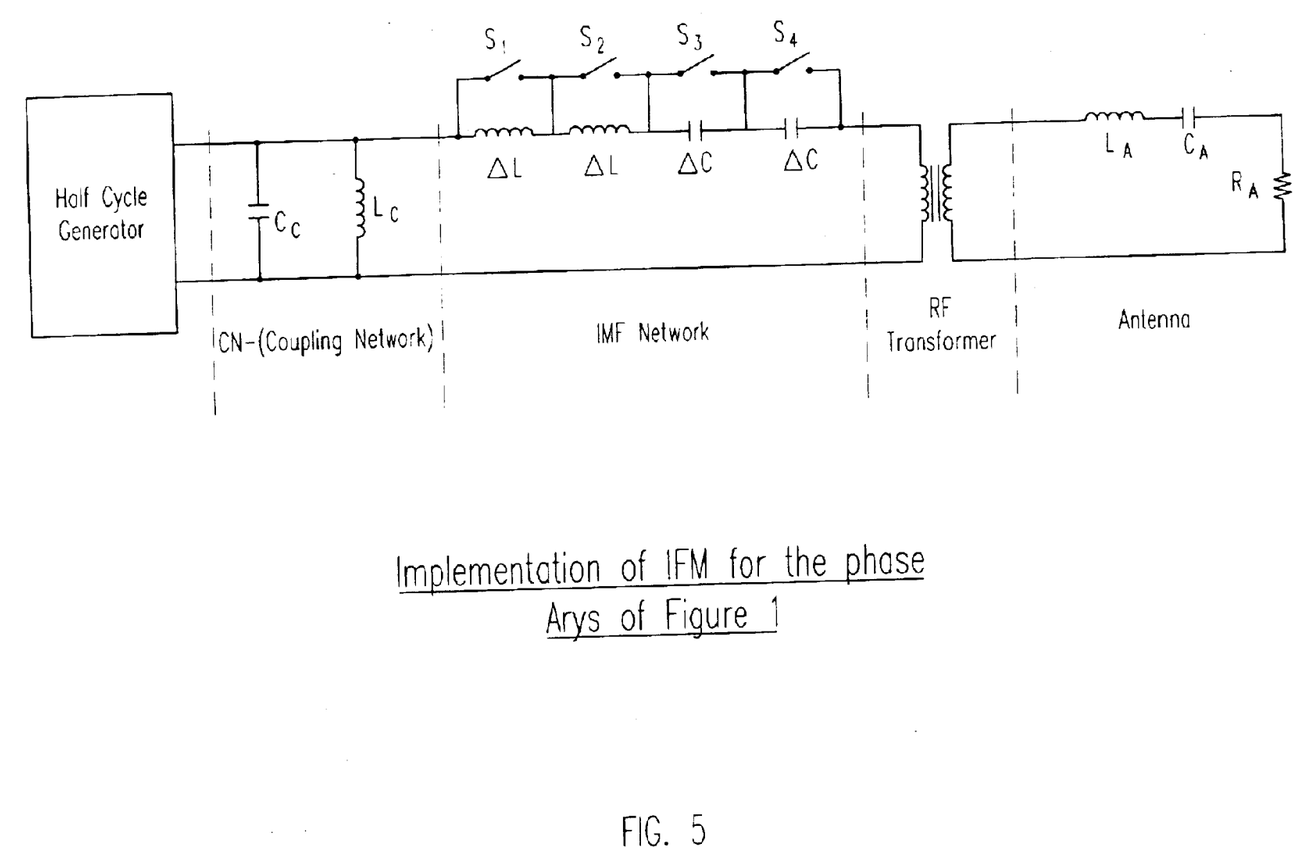
FIG. 5 is a schematic circuit diagram similar to the circuit presented in my said first copending patent application, Ser. No. 09/833,022, (now U.S. Pat. No. 6,452,547) suitable for implementing the phase arys of FIGS. 1 and 2.

The illustrative apparatus for implementing these IFM schemes comprises of two capacitors ΔC and two inductors ΔL connected in series between a coupling network CN and an RF transformer, so labeled. Each of these series elements is shunted by a corresponding switch S1–S4 which is normally open (actually, solid-state switches). By closing the switches in desired sequence, the before-discussed phase arys of FIGS. 1 and 2 and others can be obtained.

A typical solid-state Loran-C half cycle transmitter (SSX) generates Loran-C pulses, by impulse-charging a parallel tuned circuit Cc-Lc in the coupling network CN connected by the RF transformer to the transmitting Antenna represented by its series inductance $L_A$ and capacitance $C_A$, and parallel load resistor $R_A$. Both the coupling network and the Antenna are normally tuned to the 100 K Hz basic Loran-C carrier frequency. The transmitted generator charges the coupling network which, in turn, transfers energy to the Antenna with the resulting antenna current waveform envelope shown in FIG. 6.

As is further well-known, the Loran-C navigation system uses the first three cycles of the RF pulse to determine the time-of-arrival for position-fixing. Adding communication modulation, as explained in said patents, accordingly, must not disturb these cycles in phase or in frequency. Phase or frequency modulation can start, however, at 30 μsec or later into the arys diagrams of FIGS. 1, 2 and 3. By changing the normally tuned 100 kHz resonant frequency of the Antenna, the radio frequency of the antenna current will correspondingly change. In the Loran-C navigation system, however, the specifications require that the spectrum of the Loran-C rf pulse stay within the predetermined frequency band of about 90 to 110 kHz, and further that the energy both below the 90 kHz and above 110 kHz limits be less than 0.5% of the total pulse energy.

Users of the navigation system thus receive and use the initial part of each transmitted pulse for navigation timing and location. During the remaining parts of each transmitted pulse, the generated carrier frequency is swept in opposite directions in the schemes of FIGS. 1 and 2, above or below the carrier frequency during the successive further parts of each pulse, but within a predetermined band between predetermined lower and upper frequency limits on opposite sides of said carrier frequency, and using the frequency modulation effected by said sweeping to provide communication data bits. The frequency modulation sweeping during each pulse is effected by one or both of varying the inductance ΔL and capacitance ΔC in the series location between the transmitter pulse generator and the antenna, correspondingly to increase or decrease the frequency within the pulse.

Figure 1:
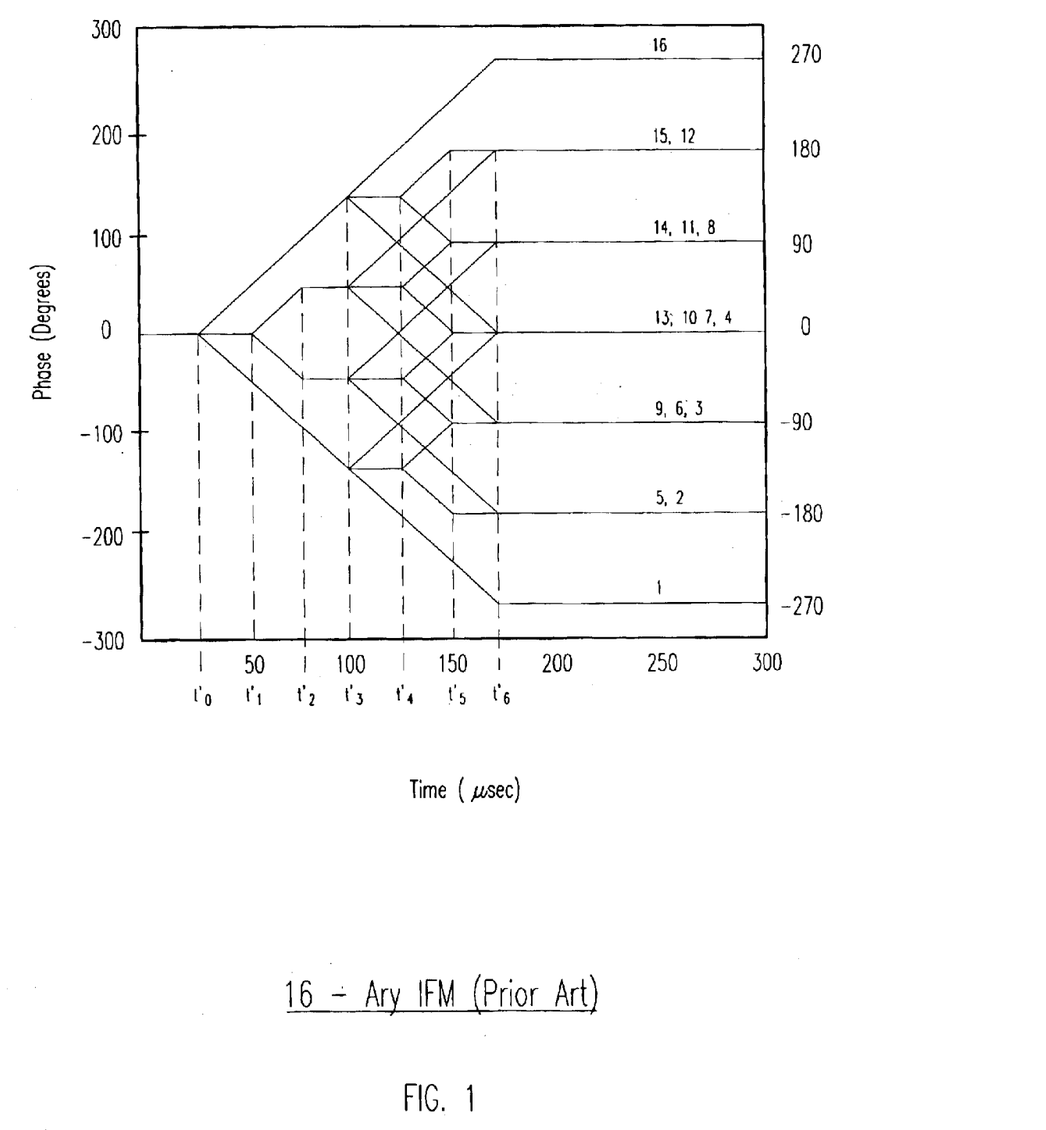
Figure 2:
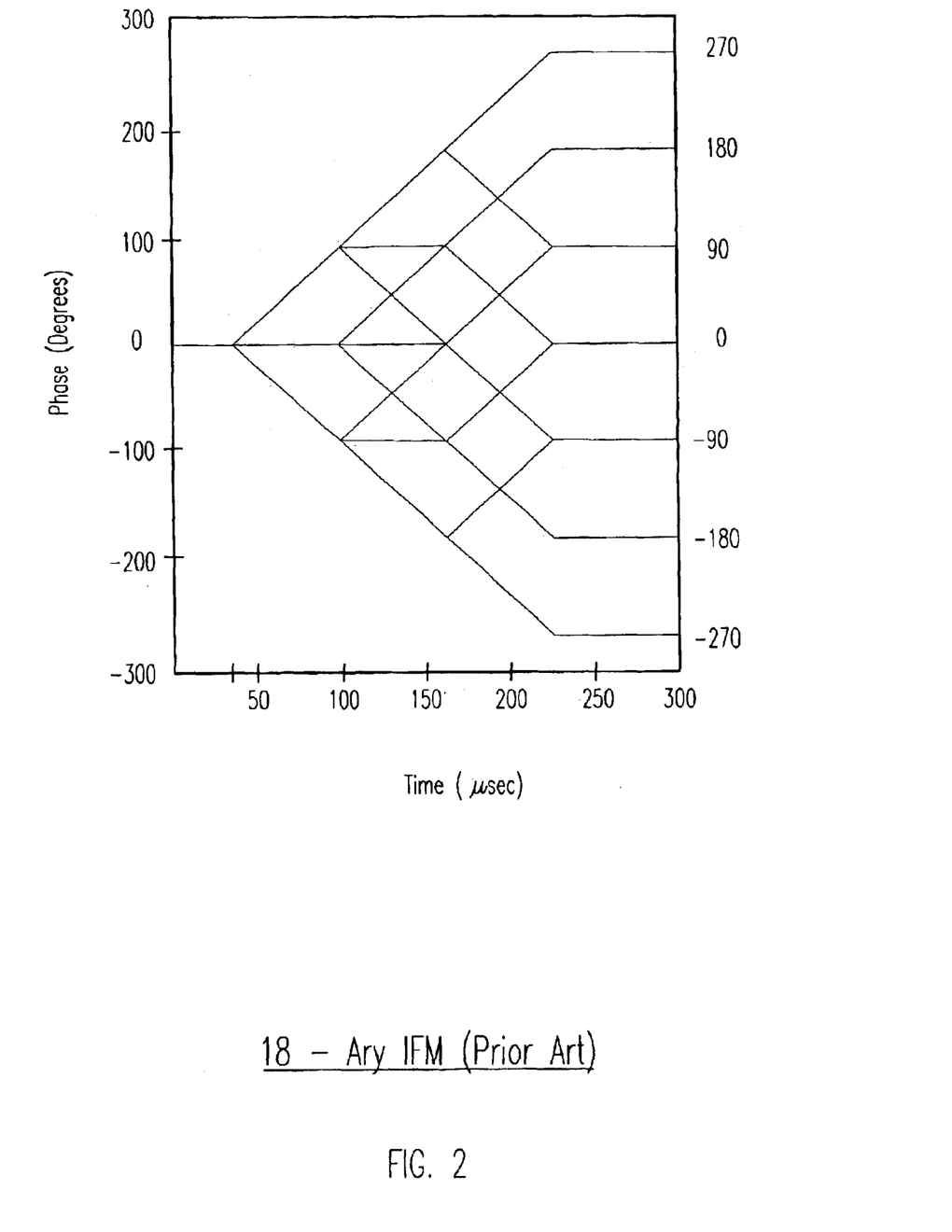
Figure 3:
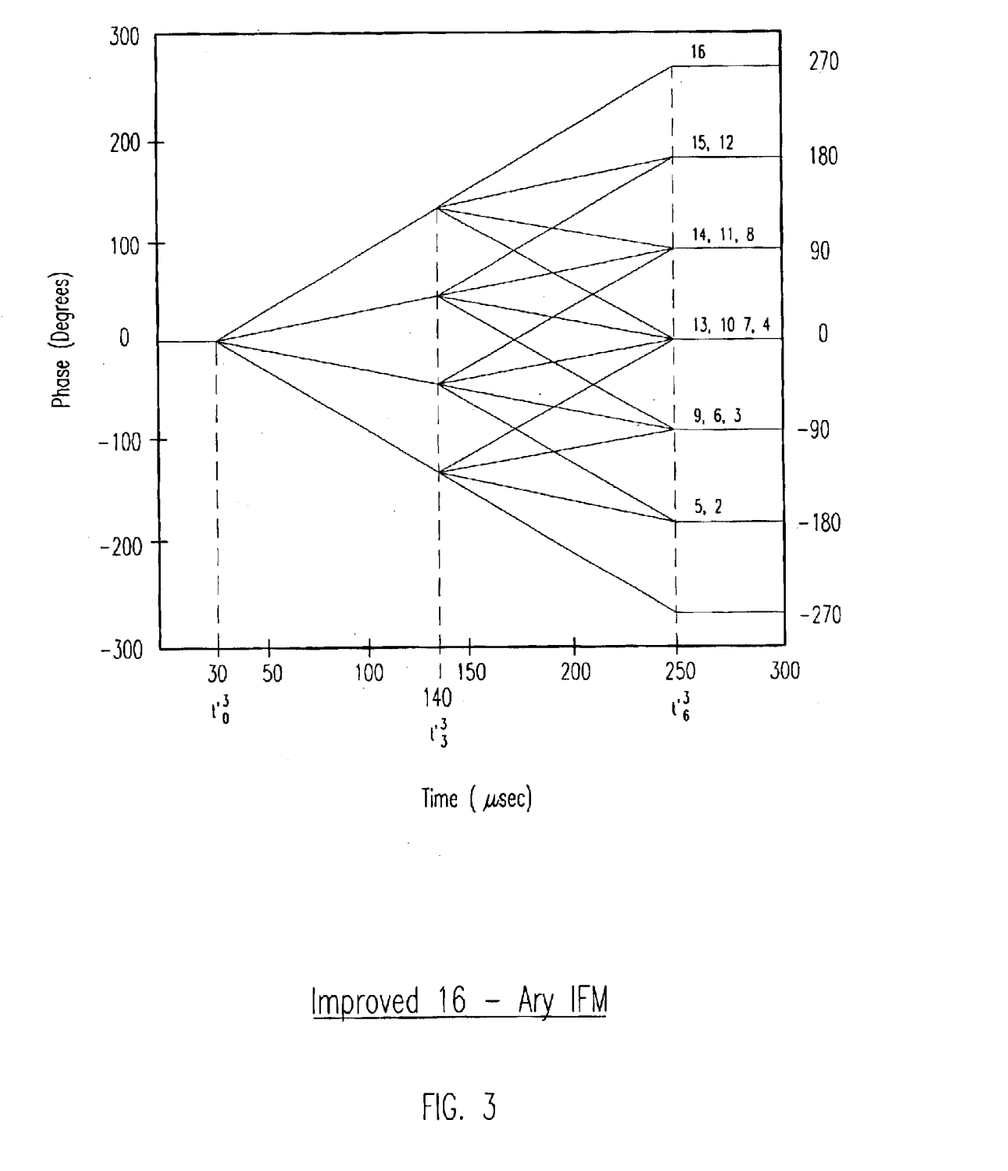
FIG. 3 is a different 16-ary IFM scheme, preferred in accordance with the invention and with very different measurement times $t_3$ and $t_6$.
Figure 4A:
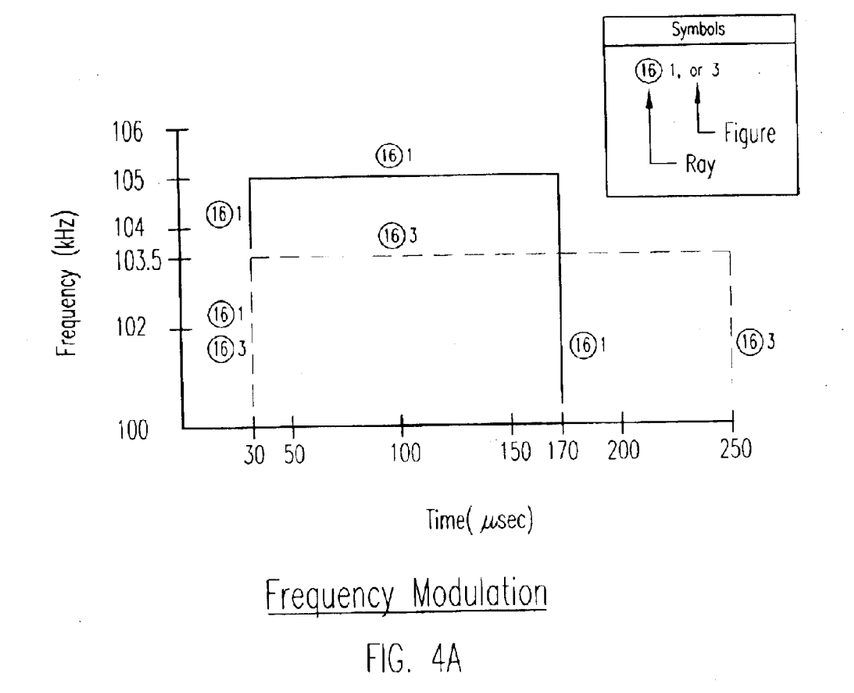
FIGS. 4(A) and (B) are graphs (frequency in kHz vs. time in μsec) illustrating the respective waveforms of ray 16 and ray 15, referenced in circles, during the Loran-C pulse in each of the ary patterns of FIGS. 1 and 3, and with the respective figure notations 1 and 3 provided adjacent the reference circles.
Figure 4B:
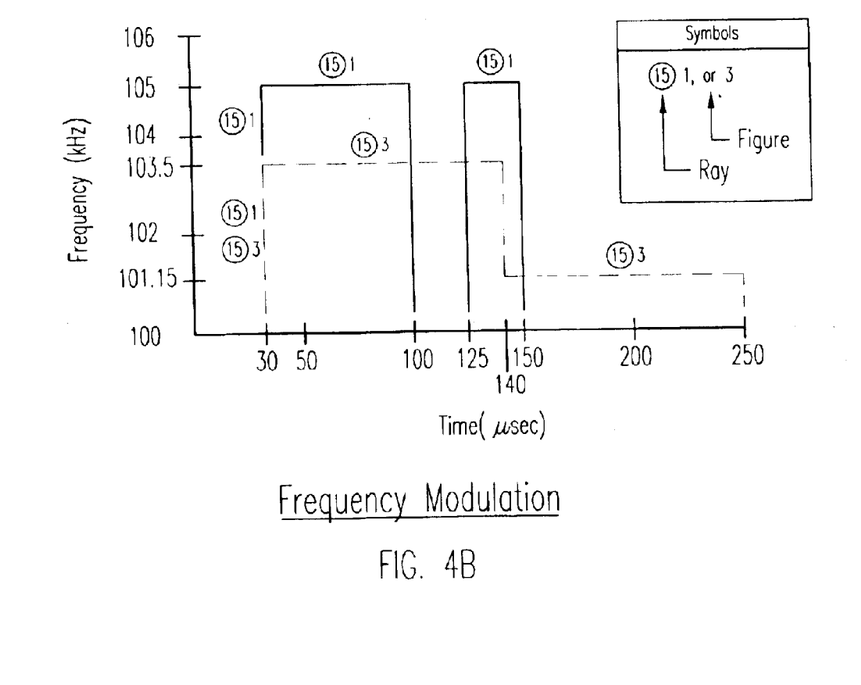

Prior proposed IFM ary schemes are shown in FIGS. 1 and 2, and the new preferred ary scheme of the invention, in FIG. 3. The phase arys shown in these figures are obtained, as before explained, by frequency hopping within the Loran-C pulse. By measuring the phase shift at times $t_3$ and $t_6$, in FIGS. 1 and 3, the IFM ary can be uniquely identified. The phase shifts for the 16-ary IFM of FIGS. 1 and 3 are shown in the following Table 1.

TABLE 1

| Ary Phase Shift at Times $t_3$ and $t_6$ | | |
| --- | --- | --- |
| Ary | Phase Shift $t_3$ | Phase Shift $t_6$ |
| 1 | −135° | −270° |
| 5 | −45° | −180° |
| 9 | +45° | −90° |
| 13 | +135° | 0 |
| 2 | −135° | −180° |
| 6 | −45° | −90° |
| 10 | +45° | 0 |
| 14 | +135° | +90° |
| 3 | −135° | −90° |
| 7 | −45° | 0 |
| 11 | +45° | +90° |
| 15 | +135° | +180° |
| 4 | −135° | 0 |
| 8 | −45° | +90° |
| 12 | +45° | +180° |
| 16 | +135° | +270° |

The preferred phase-ary scheme of FIG. 3 is implemented preferably with six capacitors ΔC and six inductors ΔL connected in series and shunted by switches $S_1$, etc. Each of these capacitor or inductor switch modules, however, has only one third the voltage rating of the switch modules of FIG. 5. The important difference resides in the fact, before stated, that the phase-ary system of FIG. 3 generate less out-of-band energy than the phase-ary system of FIG. 1. A preferred switching sequence that generate the preferred phase arys of FIG. 3 is shown in Table 2.

TABLE 2

Switching Sequence for 16 Arys of FIG. 3

| Ary | $t_0$ | $t_3$ | $t_6$ |
|---|---|---|---|
| 1 | S7, S8, S9 | | S1 → S3 |
| 2 | S7, S8, S9 | S1, S2 | S3 |
| 3 | S7, S8, S9 | S1, S2, S3, S4 | S10 |
| 4 | S7, S8, S9 | S1 → S6 | S10 → S12 |
| 5 | S7 | S8, S9 | S1 → S3 |
| 6 | S7 | | S1 |
| 7 | S7 | S1, S2 | S8 |
| 8 | S7 | S1 → S4 | S8 → S10 |
| 9 | S1 | S7 → S10 | S2 → S4 |
| 10 | S1 | S7, S8 | S2 |
| 11 | S1 | | S7 |
| 12 | S1 | S2, S3 | S7 → S9 |
| 13 | S1, S2, S3 | S7 → S12 | S4 → S6 |
| 14 | S1, S2, S3 | S7 → S10 | S4 |
| 15 | S1, S2, S3 | S7, S8 | S9 |
| 16 | S1, S2, S3 | | S7 → S9 |

Figure 6:
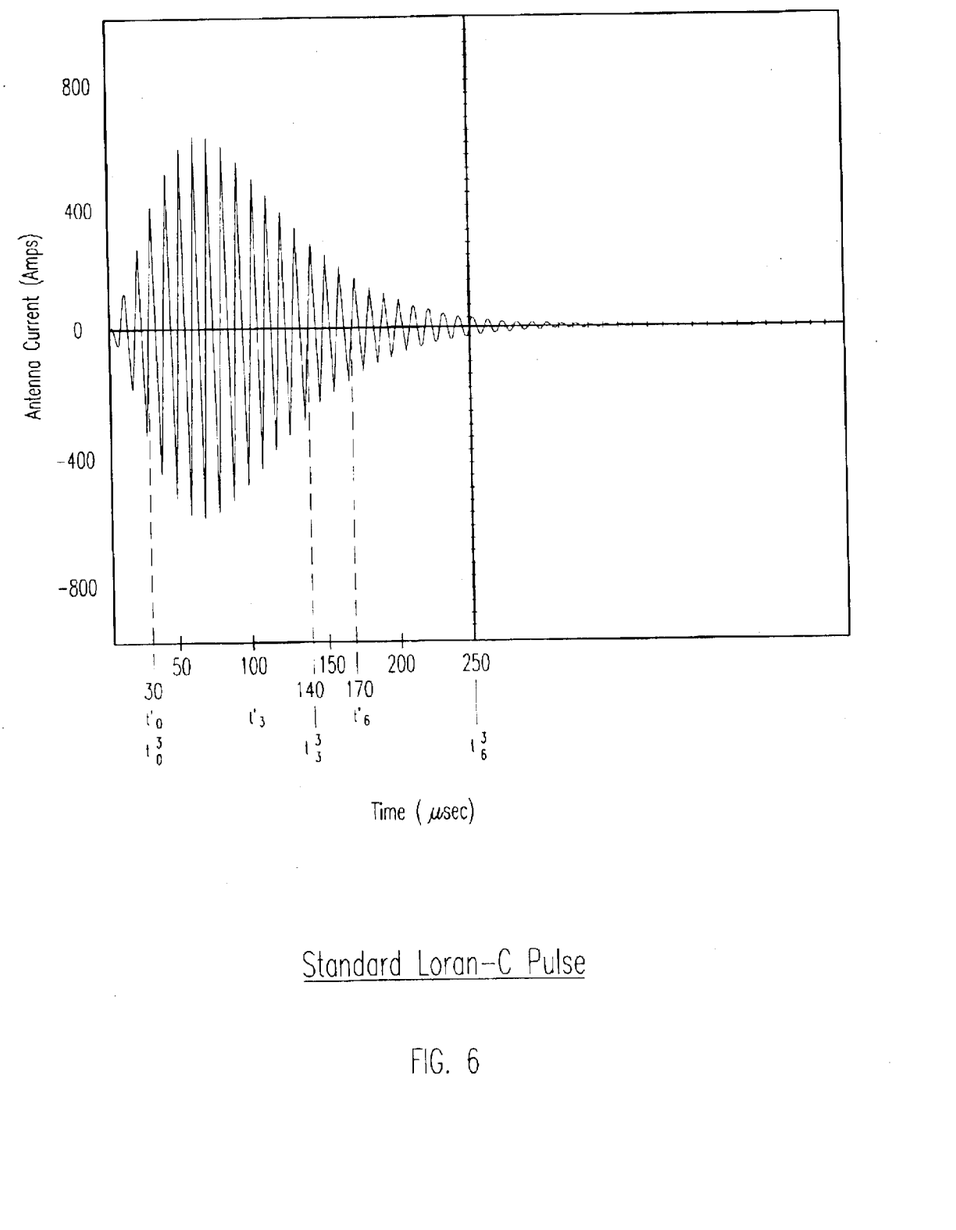
FIGS. 6 and 7 are antenna current waveforms of Loran-C pulses, FIG. 6 showing the standard pulse shape, and FIG. 7, the preferred modified flat-topped shape particularly useful with the present invention;.

As earlier mentioned, the standard Loran-C pulse shape is shown in FIG. 6. For the Peterson et al arys in FIG. 1, the initial or first modulation time interval is from 30 μsec to 100 μsec, and a second modulation time interval is from 100 μsec to 170 μsec. As is evident from FIG. 6, however, the pulse energy in this first time interval is at least four times greater than the pulse energy in the second time interval.

Figure 7:
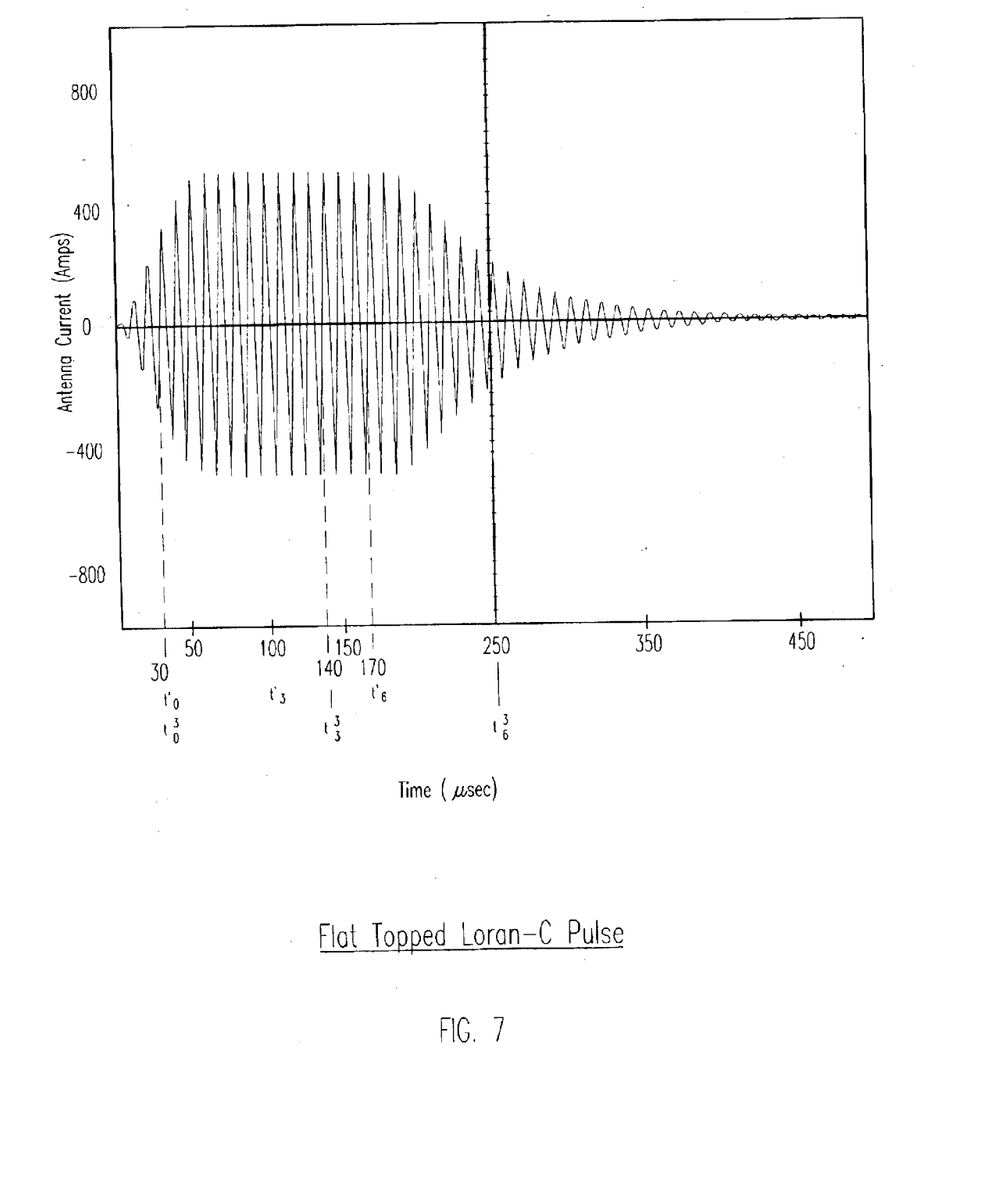

For the arys in FIG. 3 scheme of the invention, indeed, the energy in the second time interval is less than one tenth of the energy in the first time interval. To obtain optimum signal-to-noise ratio, the energy in the two time intervals should be equal. One method to equalize the energy in accordance with the present invention is to generate a flat-top Loran-C pulse as shown in FIG. 7.

Figure 8A:
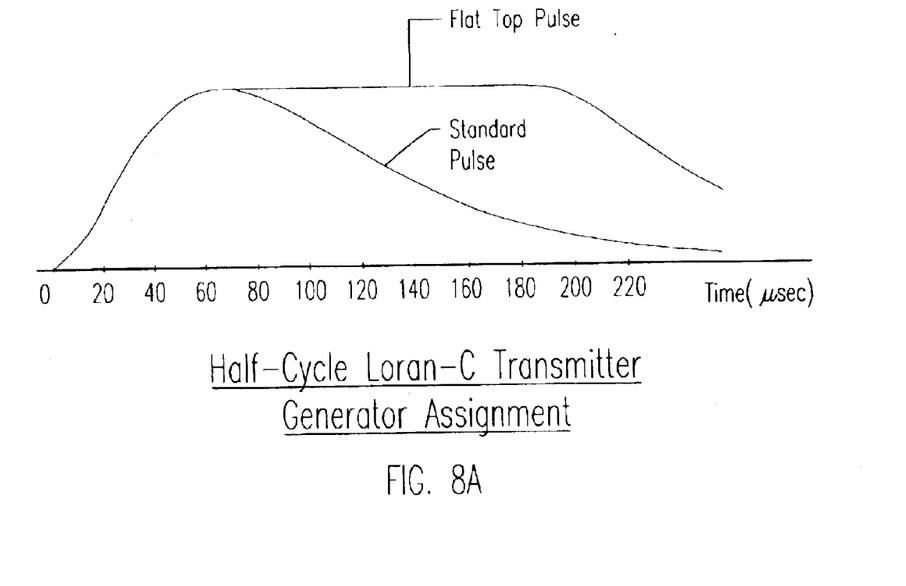
FIGS. 8A and B are amplitude waveform diagrams for the generating of the flat-topped pulse shape of FIG. 7 with half-cycle pulse generating assignment.
Figure 8B:
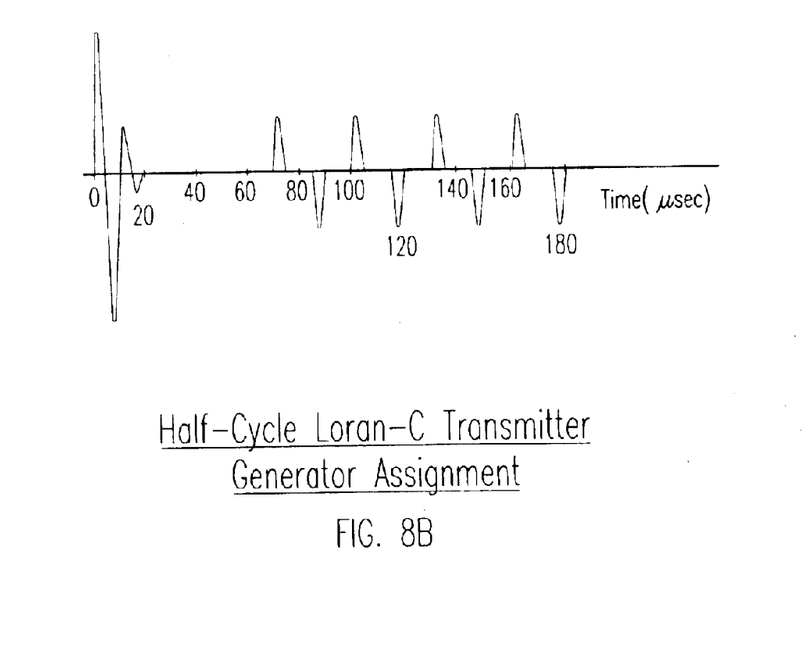
Figure 9:
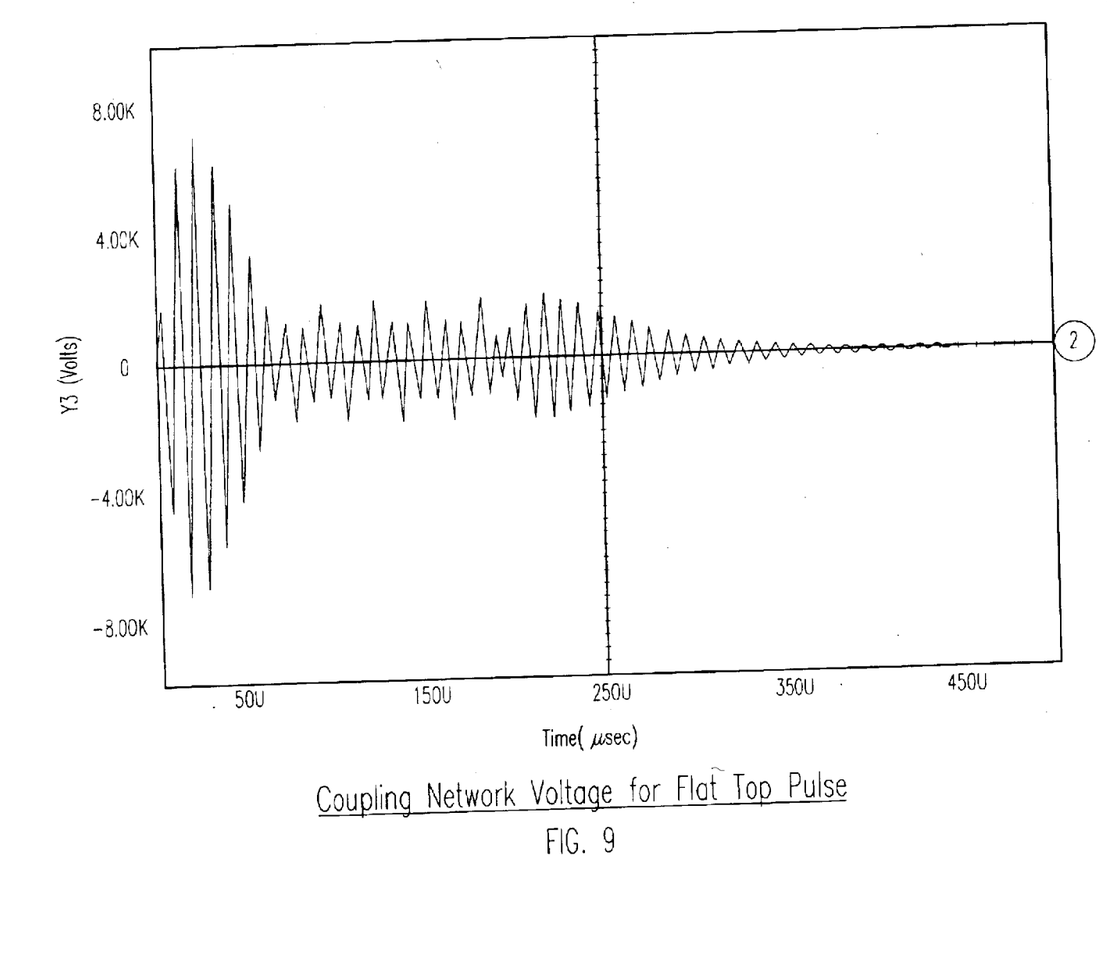
FIG. 9 is a waveform of the antenna coupling network voltage for this flat-top pulse shown in FIGS. 7 and 8A.

As earlier indicated, the Loran-C solid-state transmitter consists of an RF power generator and a coupling network. The RF power generator consists of a number of half-cycle current generators connected in parallel as detailed in said patents. These generators normally drive the first four half-cycles of the Loran pulse. To obtain the flat-top pulse shown in FIG. 6, one half of the current generators is connected to drive the first four half-cycles of the Loran-C pulse. The other half, drives half-cycles 15, 18, 21, 24, 27, 30, 33 and 36, as more particularly shown in FIG. 8. The coupling network voltage resulting from this half-cycle generator assignment is shown in FIG. 9. To perform the intrapulse frequency modulation, the antenna, as earlier explained, is rapidly tuned to the desired frequencies by fast high-power switches as described in my said copending applications and also herein. The spacings between the current generator pulses in half-cycles 15, 18, 21, 24, 27, 30, 33 and 36, moreover, are adjusted to the desired frequencies.

Figure 10:
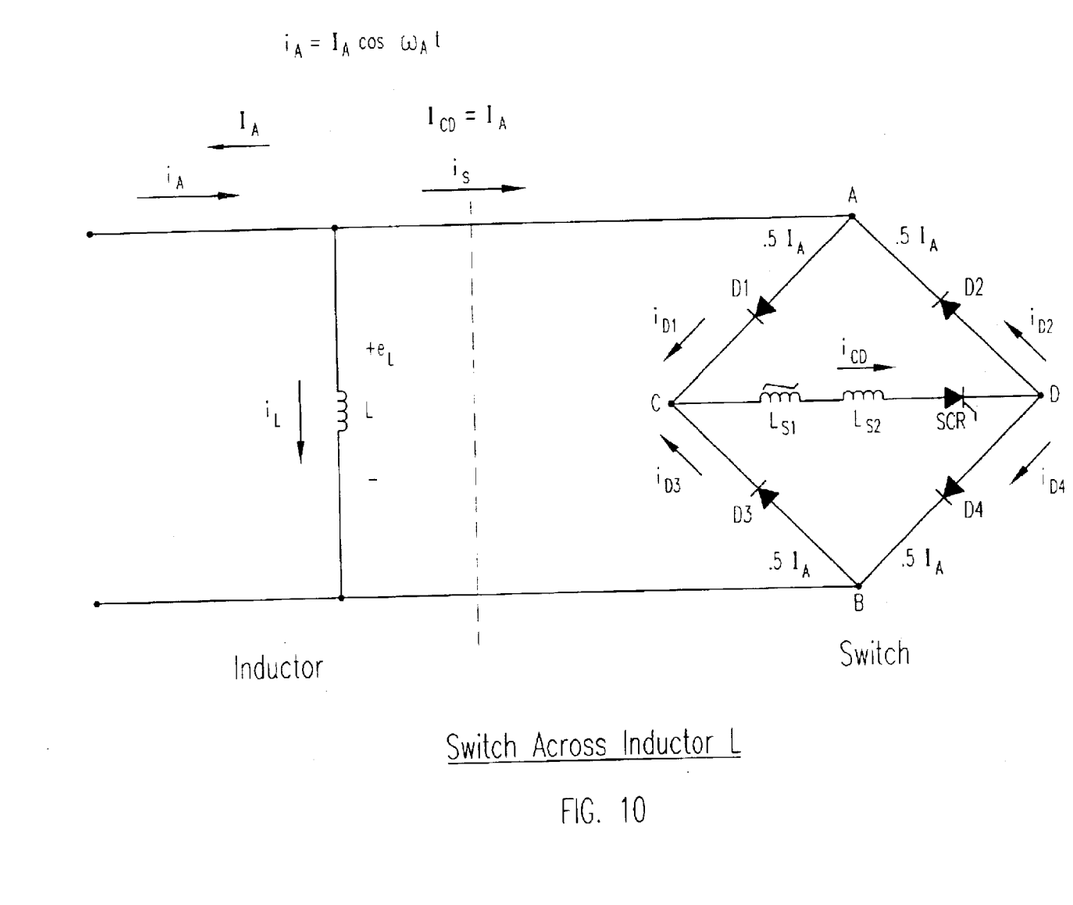
FIG. 10 is a schematic diode bridge circuit diagram similar to the circuit presented in my later said copending patent application, Ser. No. 09/922,283.

To use the flat-top Loran C pulse form, however, changes to the diode bridge circuit switch disclosed in my second copending application and reproduced in FIG. 10 hereof may be required.

In switching circuits of this type, a solid state four-terminal rectifier bridge circuit ($D_1$–$D_4$) is provided with opposing pairs of bridge terminals A, B and C, D, connected with one pair of opposing terminals A, B, shunting the series inductance L and/or the series capacitance (—more generically, the series impedance) of the antenna. Series-connected saturable and linear inductors $L_{S1}$ and $L_{S2}$ and an SCR switch are connected between the other pair C, D of the opposing terminals of the bridge circuit, whereby the high-speed triggering of SCR on, effects corresponding high-speed dynamic frequency increasing or decreasing of the frequency within the radio-frequency pulse to provide the desired intrapulse frequency modulation therein.

Figure 11:
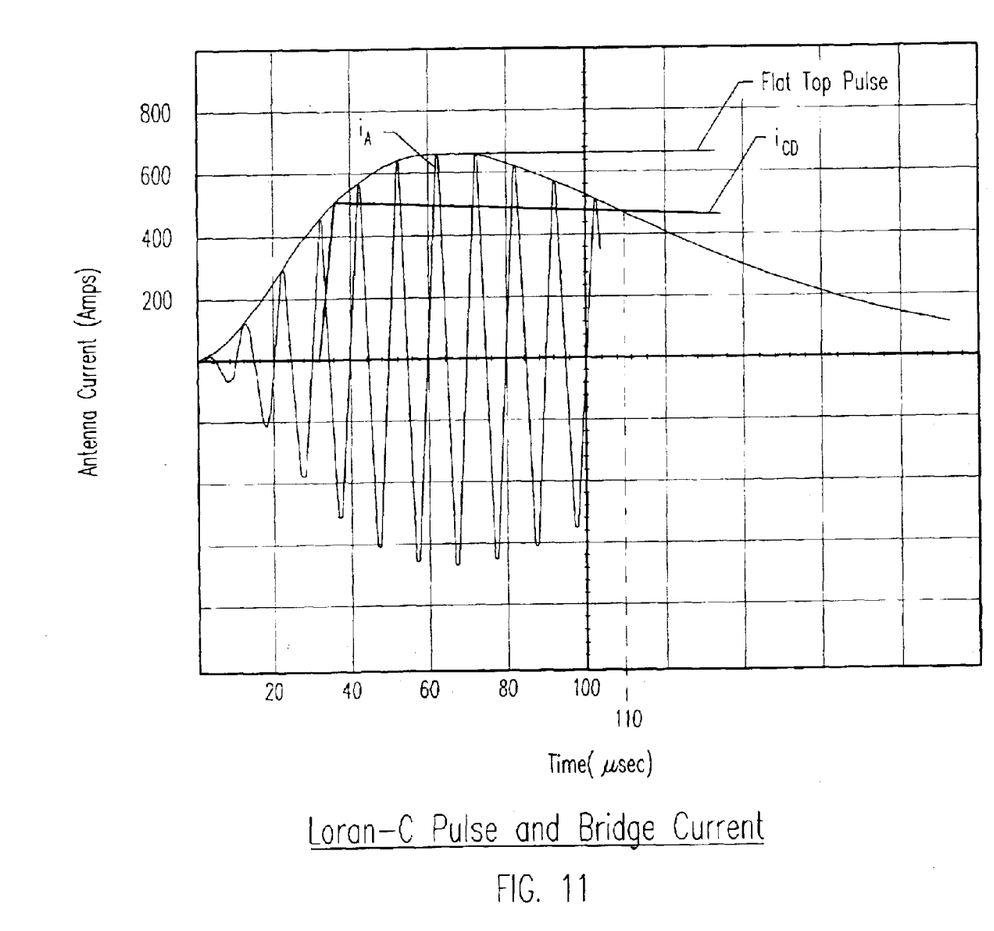
FIG. 11 is a waveform diagram superposing the diode bridge current of FIG. 10 on a normal or standard Loran-C pulse.

The diode bridge current $i_{CD}$ is shown in FIG. 11 superimposed on a normal Loran-C pulse. The current $i_{CD}$ is shown less than the antenna current in the time interval 37.5 μsec to approximately 110 μsec, so that imperfect switching may be expected in this interval.

As pointed out in my said later copending application, however, the diodes selected for the bridge are slow, general purpose rectifiers. The minority carrier recombination time thereof is long compared to 5 μsec so that almost all minority carriers in the diode junction must be swept out by the reverse current. During this sweep-out process, the voltage across the diode is very low —comparable to the forward voltage drop. Thus, the $i_{CD}$ current can be considerably less than the peak antenna current $i_A$ and still the switch can admirably perform the desired switching operation.

For the flat top pulse of the invention, FIG. 7, the situation is, however, quite different. Because of the voltage drop across the SCR and the bridge diodes, the current $i_{CD}$ decreases at a rate of approximately 1 amp per μsec. As a result, the difference in amplitude between $i_{CD}$ and $i_A$ increases beyond the value that can be taken care of by the minority carriers. To make sure that the $i_{CD}$ current can properly switch the diode bridge, the type of $i_{CD}$ current shown in FIG. 12 must be generated. To generate this type of current $i_{CD}$, it has been found that a "booster circuit" must be added to the basic switch of FIG. 10. A circuit diagram of this modified switch is shown in FIG. 13.

Figure 12:
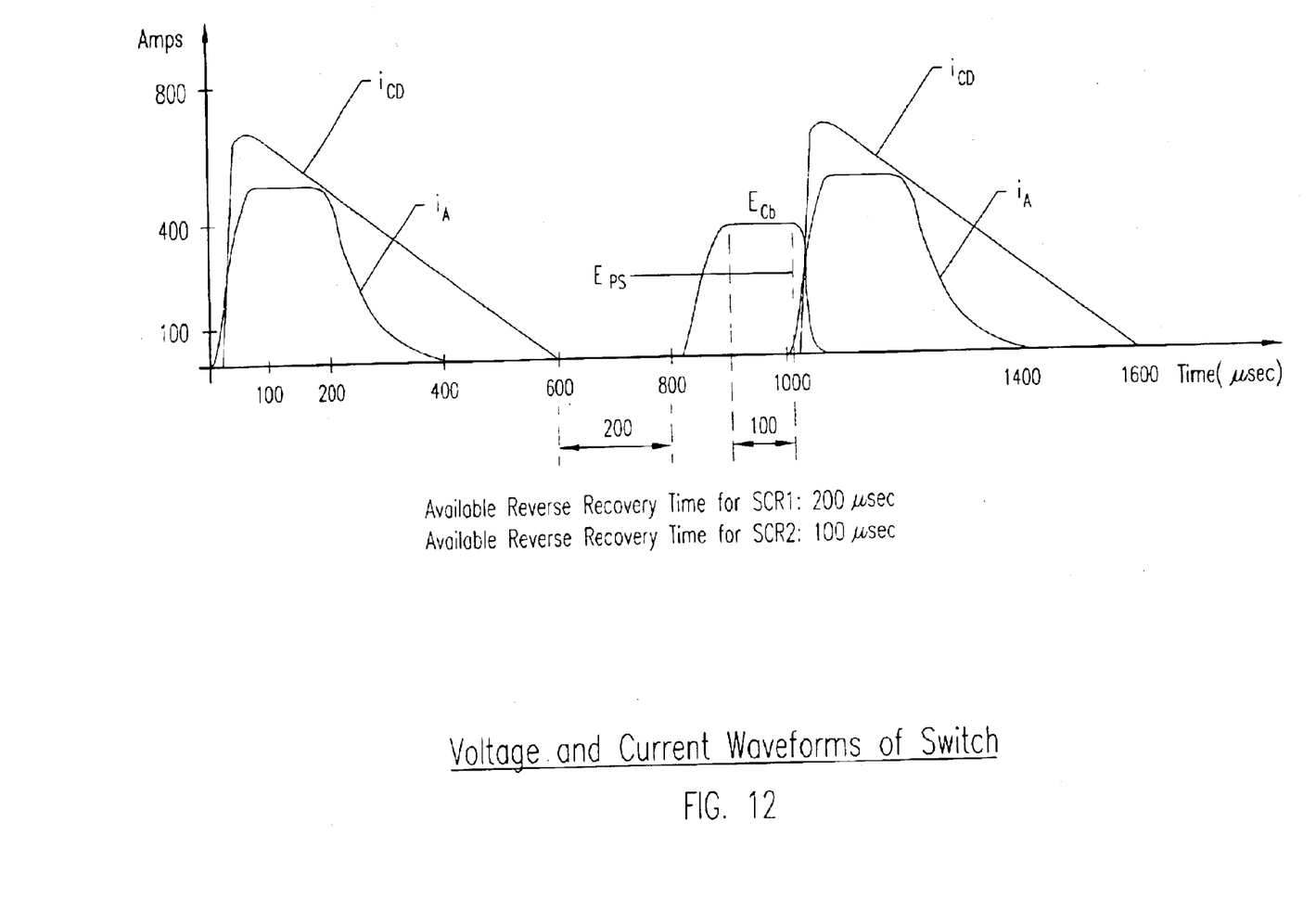
FIG. 12 shows explanatory voltage and current switching waveforms of the operation of the two switches SCR1 and SCR2 of FIG. 13.

The operation of the modified switch is as follows. In between two Loran-C pulses, the capacitor $C_b$ is charged up by turning on SCR2, as shown in FIG. 12. By using resonant charging, the voltage $e_{c_b}$ is almost double the DC supply voltage $E_{PS}$, thus turning SCR2 off. At the time 32.5 μsec after the start of the Loran-C pulse (see FIG. 12), SCR1 is turned on. The $i_{CD}$ current rises rapidly to a value greater than the antenna current $i_A$ and the voltage $e_{c_b}$ decreases to zero in approximately 30 μsec. At the same time, the $i_{CD}$ current has reached its maximum value and then starts to decrease at a rate of 1.17 amp per μsec. By adjusting the $e_{c_b}$ voltage, the $i_{CD}$ current can be made to clear the $i_A$ current with adequate margin. The voltage and current waveforms of the switch shown in FIG. 12 thus provide adequate times for the recovery of SCR1 and SCR2, ~200 μsec for SCR1 and 100 μsec for SCR2.

Figure 13:
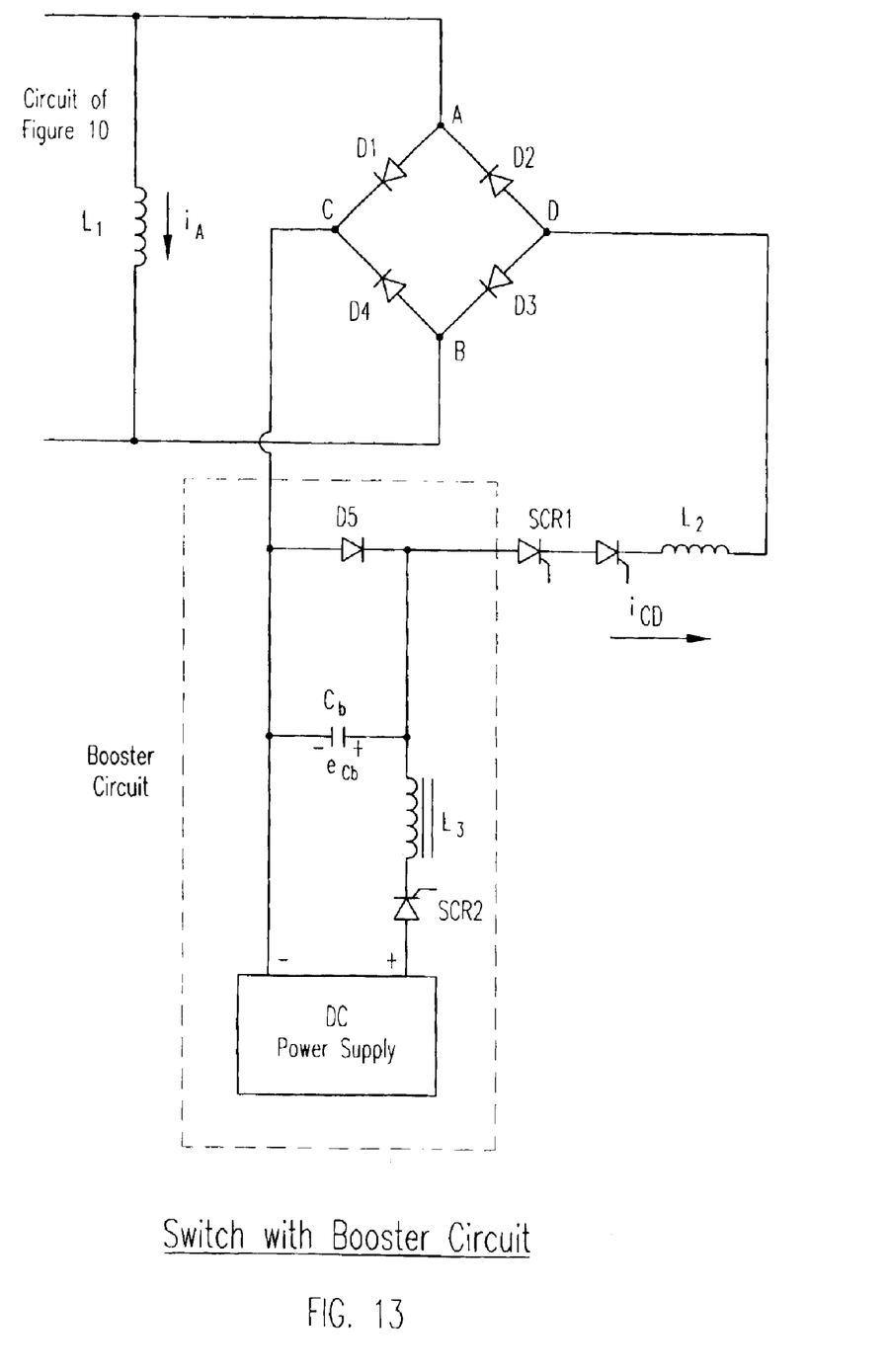
FIG. 13 is a similar diagram of a booster circuit modification of the circuit of FIG. 10 adding a further switch SCR2 in the booster required for operation with the flat-top pulse of FIG. 7 and the phase arys of preferred FIG. 3 of the present invention.

The modified circuit of FIG. 13 thus enables the use of the IFM methodology and circuits of my earlier copending applications, and the use of the novel 16-arys scheme of FIG. 13 for the advantages earlier explained.

Further modifications will also occur to those skilled in this art, and such are considered to fall within the spirit and scope of the invention as defined in the appended claims.

What is claimed is:

1. Frequency modulation switching apparatus for rapidly frequency hopping within radio-frequency pulses of radio wave pulse trains transmitted by an antenna having series impedance, the apparatus having, in combination, a solid state four-terminal rectifier bridge circuit connected to the antenna with opposing pairs of bridge terminals connected with one pair of opposing terminals shunting said impedance; series-connected saturable and linear inductors and an SCR switch connected between the other pair of opposing terminals of the bridge circuit, whereby the high-speed triggering of the SCR on, effects corresponding dynamic high-speed increasing or decreasing of hopping of the frequency within the radio-frequency pulse to provide the desired frequency modulation therein; and an SCR-controlled booster circuit for supplying booster current to the bridge circuit in the time interval within the pulse when the bridge current is less than the antenna current.

2. The apparatus of claim 1 wherein the radio-frequency pulses are Loran-C transmitter pulses.

3. The apparatus of claim 2 wherein the transmitter has shaped the Loran-C pulse to be substantially flat-topped.

4. The apparatus of claim 3 wherein the substantially flat topped shape extends substantially from about 30 to about 250 μseconds within the pulse.

5. The apparatus of claim 2 wherein said time interval is from about 37.5 μseconds to 110 μseconds into the pulse.

6. The apparatus of claim 2 wherein the booster circuit comprises a DC resonant charging circuit voltage doubler, turning off the booster circuit SCR upon reaching substantially double voltage.

7. The system of claim 1 wherein the frequency hopping is effected after the third cycle of the Loran-C radio frequency pulses.

8. The system of claim 1 wherein the frequency hopping is effected by a dynamic antenna tuning switching apparatus.

9. A method of providing frequency modulation within radio-frequency pulses transmitted by an antenna having series impedance elements, that comprises, connecting to the antenna a solid-state four-terminal rectifier bridge having two pairs of opposing bridge terminals with one pair of said terminals in shunt with said antenna impedance elements; interposing series-connected saturable and linear inductors and an SCR switch between the other pair of opposing bridge circuit terminals; high-speed triggering the SCR on, to effect corresponding dynamic high-speed frequency increasing or decreasing hopping of the frequency within the radio-frequency pulse to provide the desired frequency modulation therein, and externally boosting the current in the bridge circuit in the time interval within the pulse when the bridge circuit current is less than the antenna current.

10. The method of claim 9 wherein the radio-wave pulses are Loran-C navigation pulses.

11. The method of claim 10 wherein the Loran-C pulse is shaped to be substantially flat-topped.

12. The method of claim 11 wherein the substantially flat topped shape extends substantially from about 30 to about 250 μseconds within the pulse.

13. The method of claim 11 wherein the frequency hopping occurs after the third cycle of the radio-frequency pulse.

14. The method of claim 10 wherein said time interval is from about 37.5 to 110 μseconds into the pulse.

15. The method of claim 9 wherein the switching sequence is that of 16 arys.

16. The method of claim 9 wherein the boosting current is controlled by a further SCR switch, with reverse recovery times for the first-named and further SCR switches of the respective order of about 200 and 100 μseconds.

* * * * *